United States Patent [19]

Hardiman

[11] Patent Number: 4,778,864

[45] Date of Patent: Oct. 18, 1988

[54] ACID-STABILIZED METAL DRIER

[75] Inventor: Christopher J. Hardiman, Belchertown, Mass.

[73] Assignee: Monsanto Company, St. Louis, Mich.

[21] Appl. No.: 946,740

[22] Filed: Dec. 24, 1986

[51] Int. Cl.$^4$ .............. C08F 4/44; C08F 4/46; C08F 2/00; C08F 16/12
[52] U.S. Cl. .................. 526/143; 526/173; 526/214; 526/332
[58] Field of Search .......... 526/214, 332, 173, 143

[56] References Cited

U.S. PATENT DOCUMENTS

| | | | |
|---|---|---|---|
| 4,059,616 | 11/1977 | Lewis et al. | 526/328.5 |
| 4,064,161 | 12/1977 | Lewis et al. | 526/328.5 |
| 4,145,248 | 3/1979 | Van Eenam | 162/168 R |
| 4,520,184 | 9/1985 | Van Eenam | 526/320 |
| 4,590,101 | 5/1986 | Knapczyk | 525/306 |

OTHER PUBLICATIONS

CA 90:169079b, 1979 Belogorodskaya et al.
Chemical Abstract: CA81(5):25111X, Ohashi et al. "Stabilization of alpha-cyanoacrylates." Kokai 49/31619.
Chemical Abstract: CA93(26):240735g, Toa Gosei Chemical Industry Co., Ltd. "Stabilizers for cyanoacrylate ester adhesives." Kokai 55/99980.
Chemical Abstract: CA90(22):169079b, "Copolymerization of cyclopentadiene with indene in the presence of the trifluoroacetic acid-cobalt acetate catalytic system" (copy enclosed—not translated).
Chemical Abstract: CA106(2):17697n, Taqui-Khan, et al. "Kinetics and mechanism of ruthenium (III)-catalyzed oxidation of allyl alcohol by molecular oxygen." (copy enclosed)

Primary Examiner—Joseph L. Schofer
Assistant Examiner—N. Sarofin
Attorney, Agent, or Firm—R. Bruce Blance; Thomas E. Kelley; William J. Farrington

[57] ABSTRACT

Coating compositions comprising (a) free-radical polymerizable compound, (b) metal drier reversibly inhibited to catalyzing free-radical polymerization by a fugitive acid and (c) an allyloxy compound exhibiting long pot life and rapid cure, e.g. at elevated temperature, to hard, tough coatings.

11 Claims, No Drawings

ACID-STABILIZED METAL DRIER

Disclosed herein are inventions relating to metal driers, especially acid-stabilized metal driers, and coating systems and methods of coating using such metal driers.

Metal driers, traditionally known as metal soaps although fatty acid are not a required component, are used, e.g. as catalysts in the coating industry, to accelerate oxidation and/or polymerization reactions associated with the curing films. Among the more commonly used metal driers, cobalt and manganese compounds are often preferred to achieve a balance of properties such as speed of cure, color stability, film durability, e.g. scratch and solvent resistance, etc.

Because metal driers serve to catalyze the film curing reactions, pot life of coating compositions can be adversely affected by the presence of metal drier, especially when free-radical initiator is included in the coating compositions.

In some cases short pot life is tolerated. In other cases short pot life is avoided by using multiple (e.g. two) component formulations which are mixed concurrently with application (e.g. in a dual feed spray nozzle) or by separately applying a coating containing the metal drier.

An object of this invention is to provide a stabilized metal drier allowing long pot life of coating compositions, even containing free radical initiators.

Another object is to provide coating compositions and methods of coating using such stabilized metal drier without detracting from desired properties of coating systems.

These and other objects which will be apparent from the description of this invention are provided by providing a metal drier that is acid-stabilized.

SUMMARY OF THE INVENTION

Disclosed herein are inventions providing acid-stabilized metal drier (e.g. a cobalt or manganese compound) comprising a strong, fugitive acid. Also disclosed are inventions of coating compositions comprising unsaturated compounds and such acid-stabilized metal driers. Other inventions relate to processes for coating substrates with a film of cured polymer by applying to a substrate such coating compositions.

In preferred embodiments such compositions can comprise polyallyloxy compounds and/or free radical initiators.

DETAILED DESCRIPTION OF THE INVENTION

The acid-stabilized metal drier of this invention comprises a metal compound that is effective in catalyzing free-radical polymerization of unsaturated compounds where the catalytic effect of the metal compound is reversibly inhibited by a strong, fugitive acid, such as trifluoroacetic acid or other acid having substantially similar properties of strength, transience and miscibility with coating system components. The metal compound can include any of the metal driers which are well known in the coating industry. Preferred metal compounds include cobalt or manganese compounds, e.g. fatty acid salts of such metals. In preferred embodiments the cobalt compound can comprise any of a variety of compounds such as cobaltous acetate, citrate, acetyl-acetonate, 2-ethyl hexanoate and the like.

In characterizing the acid useful in the metal driers, coating compositions and processes of this invention, the term "fugiitive" describes the transience of the acid under coating conditions. For instance, desirable acids are a generally stable component of such metal driers, or coating compositions, providing inhibition of the catalytic action of the metal drier. However, when films of such coating compositions are subjected to curing conditions, e.g. elevated temperatures or reduced vapor pressure, the inhibiting effect of the acid is advantageously diminished. The transience of such fugitive acid can be due to evaporation, e.g. for acids having low boiling points or from decomposition, e.g. for acids of low stability at elevated temperatures, or from other phenomena tending to neutralize the effect of the acid on the metal drier catalyst. The term "strong" used in describing such acids preferably means an acid stronger than acetic acid, i.e. having a pKa greater than that of acetic acid.

In many cases preferred acids are carboxylic acids having boiling points lower than cure temperatures of the coating systems, e.g. acids having boiling points less than about 150° C., in many cases more preferably less than about 120° C. In this regard such a preferred acid is trifluoroacetic acid, having a boiling point of about 72° C.

In other cases preferred acids will tend to decompose into volatile components at temperatures lower than the cure temperature. Such decomposing acids can comprise carboxylic acid such as glycolic acid or mineral acid such as hydrochloric acid.

The amount of acid is preferably sufficient to materially retard the catalytic effect of the metal compound at least at storage conditions of coating compositions. In general higher levels of acid (e.g. up to about 20, or even 50 times the amount of metal on a weight basis) can be tolerated and may be desired to assure sufficient catalytic retardation. In most cases it is believed to be useful to provide more acid than the equivalent amount of metal compound.

Metal compounds ae often provided in coating compositions at catalytic levels of from about 0.001 to about 1.0% by weight; the acid can be provided at levels from about 0.01 to about 10% by weight.

The acid-stabilized metal drier of this invention can be provided as a solution or suspension of metal compound in the acid, e.g. trifluoroacetic acid, alone or with other commonly used solvents including water, ketones such as methyl isobutyl ketone, methyl ethyl ketone, acetone and the like and mixtures thereof. In some cases it may also be advantageous to provide a free radical initiator with the metal drier. Such free radical initiator can comprise peroxides such as t-butyl hydroperoxide, cumene peroxide, methyl ethyl ketone peroxide, lauroyl peroxide, benzoyl peroxide, azo-bis(isobutyronitrile) and the like and mixtures thereof.

The metal drier of this invention is effectively stabilized by the strong acid which effect is generally advantageously promoted by the presence of at least a minor amount of water to promote hydration of the acidic proton. Since water is often present in minor but sufficient amounts in components used in the driers and coating compositions of this invention the deliberate addition of specific quantities of water is often not required.

Also provided herein is an invention of coating compositions comprising the acid-stabilized metal drier of this invention and free radical-polymerizable compound which can be aerobicly or anaerobicly curable.

The free radical-polymerizable compound useful in the composition of this invention can be an unsaturated monomer or oligomer or mixture of monomers and oligomers. The nature of the compound is not critical so long as it is activated towards free radical polymerization via the double bonds when it is brought into reactive admixture with a metal drier and/or free-radical initiator. Such compounds include drying oils such as castor, linseed, oticica, safflower, soybean, sunflower, tung and certain fish oils; acrylic monomers; vinyl monomers such as styrenic monomers, vinyl ethers, vinyl esters, vinyl imides, vinyl amides; maleates and fumarates. In many cases it is preferred that such compounds be selected from acrylyl monomers or oligomers; such preferred compounds desirably having a number average molecular weight less than about 4000 and contain from 1 to about 10 unsaturated groups per molecule. A particularly preferred group of acrylyl monomers is represented by the structure:

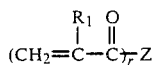

where $R_1$ is selected from the group consisting of H, $CH_3$ and $C_2H_5$, where r is an integer in the range of 1 to 10 and Z is a saturated or ethylenically unsaturated residue of an alcohol or polyol, a carboxylic acid or poly carboxylic acid, an amine or a polyamine, an epoxide or polyepoxide or an isocyanate or polyisocyanate of a number average molecular weight less than about 4000 containing a hydrocarbon, ester, amide, ether or urethane backbone. Such monomers may be obtained by reaction of acryloyl, methacryloyl or ethacryloyl chloride with an alcohol, a polyol, an amine, or a polyamine or by the reaction of acrylic acid, methacrylic acid or ethacrylic acid with an epoxide, a polyepoxide, an isocyanate, or a polyisocyanate, or by reaction of a hydroxyalkyl acrylate, methacrylate or ethacrylate with a carboxylic acid, polycarboxylic acid, an epoxide, a polyepoxide, an isocyanate, or a polyisocyanate. Such monomers include methyl acrylate, methyl methacrylate, butyl acrylate, 1,3-butylene glycol diacrylate, 1,6-hexanediol diacrylate, the polyacrylates, polymethacrylates and polyethacrylates of polyethylene glycols and polyols, polypropylene glycols and polyols and poly(tetramethylene glycols) and poly(tetramethylene) polyols of molecular weight in the range of 100 to 4000, pentaerythritol tetracrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, and the polyacryloyl monomers prepared by reacting isocyanate capped polyethers and isocyanate capped polyesters of molecular weight up to 4000 with hydroxyethyl acrylate.

The coating compositions of this invention can also comprise crosslinking agent.

In many cases the coating compositions will also comprise an allyloxy compound which may tend to activate the cure process. Certain allyloxy compounds can advantageously serve as crosslinking agents to provide desirable cured film properties. Suitable allyloxy compounds are selected from β,γ-unsaturated ethers having at least one α-hydrogen atom in which the allyloxy group may be represented by the following formula:

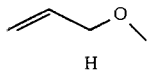

The β,γ-unsaturated ether compound has an equivalency less than about 300, based upon the number of β,γ-unsaturated ether groups having an α-hydrogen, a molecular weight less than about 10,000, and has from 1 to 60 β,γ-unsaturated ether groups.

The allyloxy compounds are generally aliphatic in character. Alternatively, compounds having β,γ-unsaturation with a triple bond as in propargyl methyl ether, dipropargyl ether, tripropargyl trimethylol propane, or hexapropargyl sorbitol may be used and are considered equivalent to allyloxy compounds for purposes of this invention. Exemplary of allyloxy compounds useful in the compositions of this invention are the following: methyl allyl ether, methyl methallyl ether, butyl allyl ether, diallyl ether, allyl methallyl ether, dicrotyl ether di-(2-chloro-2-propenyl)ether, di-(2-phenyl-2-propenyl) ether, di(1-methyl-2-propenyl)ether, 1-phenyl-2-propenyl ether, di-(3-phenyl-2-propenyl)ether, di-(2-isopropyl-2-propenyl)ether, 1,4-diallyl oxy-2-butene, 1,4-diallyloxy-2-butyne, 1,6-diallyl oxyhexane, 1,4-dimethallyloxypentane, 2,5-dimethoxy-2,5-dihydrofuran, allyl glycidyl ether; allyloxy compounds prepared from the ionic polymerization of allyloxyalkyl acrylates, methacrylates, acrylamides or the allyloxy derivatives of vinyl ethers, such as poly(allyloxyethylmethacrylate) and poly(allyl vinyl ether); allyloxy compounds wherein the allyloxy group forms part of an oligomeric backbone, such as poly(2-buten-1,4-diol) or 2,5-poly(2,5-dihydrofuran).

Preferred allyloxy compounds may be selected from the group of polyethers and polyesters represented by the structural formulae:

where $R_2$ is a radical of molecular weight less than about 10,000 obtained by removal of active hydrogen from an active hydrogen compound selected from the group consisting of water, alcohols, thiols, carboxylic acidds, carboxylic amides and amines, where the functionality of $R_2$ is n and is in the range of 1 to 10, where E is a divalent radical selected from the group represented by the formulae

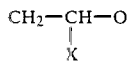

and

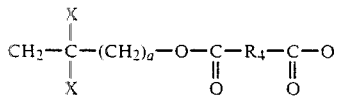

where the X groups ae independently selected from the group consisting of H, $CH_3$, $C_2H_5$ and $CH_2OCH_2Y$, Y being selected from the group consisting of $CH=CH_2$, $H_3C-C=CH_2$, and $H_5C_2-C=CH_2$, where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 4 and not more than about 60. It is anticipated that any of the hydrogens in Y, except at least one alpha to the ether group, can be replaced with a lower alkyl without substantially affecting the invention and that the resulting compounds would be equivalent to those according to the invention. Polyethers containing an allyloxy group may be prepared by ionic polymerization of allyl glycidyl ether or mixtures of allyl glycidyl ether and the appropriate alkylene oxide and polyesters containing an allyloxy group may be prepared by polymerization of a suitable dicarboxylic acid and the monoallyl ether of glycerol. Suitable polyesters may also be prepared by substituting for the monoallyl ether of glycerol, the monoallyl ether of trimethylolethane, the monoallylether of trimethylolpropane, the monoallyl ether of pentaerythritol, the diallyl ether of pentaerythritol and similar mono and polyallyl ethers of polyols. Allyl glycidyl ether or methallyl glycidyl ether may also be substituted for the monoallyl ether of glycerol.

Another group of preferred allyloxy compounds is represented by the structural formula:

$$R_5(OCH_2Y)_p$$

where $R_5$ is a $C_2$ to $C_{12}$ aliphatic hydrocarbyl or oxahydrocarbyl radical or equivalence p in the range of 2 to 12 and Y is a group as defined hereinabove. Such compounds include tetrallyl pentaerythritol, hexaallyl dipentaerythritol, hexallyl sorbitol, hexamethallyl mannitol, tetraallyl-β-methyl glucoside, and decaallyl sucrose.

Yet another group of preferred allyloxy compounds are acetals derived from allyl alcohol or methallyl alcohol and aldehydes and those derived from a polyol and an acrolein compound represented by the structural formulas:

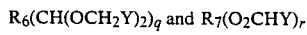

$$R_6(CH(OCH_2Y)_2)_q \text{ and } R_7(O_2CHY)_r$$

where $R_6$ is absent or is a $C_1$ to $C_{20}$ unsubstituted or a substituted hydrocarbyl group, Y is a group as defined hereinabove and q is in the range of 2 to about 30; and where $R_7$ is a radical of molecular weight less than about 10,000 obtained by removal of at least two active hydrogens from a polyol and r is in the range of about 1 to about 170. Such compounds include 1,1,2,2-tetrakis(allyloxy)ethane, 1,1,6,6-tetrakis(allyloxy)hexane and those derived from acrolein, methacrolein or crotonaldehyde and a polyol and those derived from polyacrolein and acrolein copolymers. Exemplary are triallylidine sorbitol and the polyacrolein acetal of polyvinyl alcohol.

The more preferred allyloxy activator compounds are the polyether and polyacetal compounds in which the number of allyloxy groups per average molecule is in the range of 2 to 40 and the allyloxy equivalent is less than about 250. Most preferably the allyloxy equivalent is less than about 150.

Depending on the end use and the application requirements it may be convenient to add any of the other conventional additives for surface coating compositions such as solvents, pigments, fillers, reinforcing agents, stabilizers, inhibitors and flow control agents.

The proportions of the ingredients can vary widely depending on the compatibility of the major ingredients and the nature of the coating to be obtained. The major ingredients are advantageously selected to be compatible with one another to provide a sufficiently rapid cure of the coating and to avoid impairment of gloss and clarity of the cured coatings. Compatibility is readily determined by mixing the major ingredients and determining the range of mixtures which do not form cloudy solutions or coatings or separate into phases. Provided that the major ingredients are suitably compatible, a weight range of allyloxy compound to free-radical-polymerizable compound (e.g. in the range of from 70:30 to 1:99) can be used. Preferably this ratio will be in the range from 40:60 to 5:95 to provide an adequate rate of cure and an adequate level of mechanical properties in the cured coating.

In those cases where it may be desirable to provide solvent (or vehicle) for the coating composition of this invention, such solvent is preferably a volatile organic compound comprising a ketone, such as acetone, methyl ethyl ketone, methyl isobutyl ketone, etc.; an ester such as ethylene glycol monoethyl ether acetate; an aromatic such as toluene, xylene; or a mixture thereof.

The following disclosure is provided to illustrate specific embodiments and aspects of this invention but does not imply any limitation of the scope of the invention.

In the following described materials, the symbol "(n)" indicates a solution in the identified solvent where "n" is the weight percent of the described material in solution.

MATERIALS USED

UVI(n): acrylated urethane oligomer obtained from Morton-Thiokol Company as Uvithane-893, unsaturation 0.15–0.175 equivalents/100 g; diluted with MEK to provide a solution of weight percent indicated in parenthesis, e.g. UVI(75) is 75 wt.% of acrylated urethane oligomer.

AOC: allyloxy compound, a reaction product of ethylene glycol and allyl glycidyl ether (1:10 mole ratio) in the presence of boron trifluoride/etherate catalyst at 75°–80° C. The allyl glycidyl ether is added over a period of 5 hours. The catalyst is neutralized with NaOH solution. The aqueous phase is separated from an organic phase product which is dried and filtered. The liquid organic product has a Gardner viscosity of F at 25° C. and an allyloxy equivalent of about 120.

MEK: methyl ethyl ketone.

MAK: methyl amyl ketone.

BPO(n): benzoyl peroxide in MEK solution.

Co(n): a cobalt catalyst compound obtained from Nuodex, Inc. as Nuocure TM 10% cobalt catalyst in mineral spirits; solution diluted with MEK to weight percent cobalt indicated in parenthesis, e.g. Co(0.1) is 0.1 wt.% cobalt.

TFA(n): trifluoroacetic acid in MEK solution.

BYK: a mar and slip additive obtained from Mallinkrodt, Inc. as BYK-341.

ETOH(n): ethanol in water solution.

GAA(n): glacial acetic acid in MEK solution.

GLY(n): glycolic acid in MEK solution.

OXA(n): oxalic acid in MEK solution.

TCA(n): trichloroacetic acid in MEK solution.

MCA(n): monochloroacetic acid in MEK solution.

CNA(n): cyanoacetic acid in MEK solution.

HCl(n): hydrochloric acid (37% in water) in MEK solution

Mo(n): molybdenum (V1) dioxo bix(2,4-pentane dionato) in MEK, "n" indicates weight percent-molybdenum.

Mn(n): manganese naphthenate, in MEK, "n" indicates weight percent manganese.

EXAMPLE 1

This example serves to illustrate the use of trifluoroacetic acid as a strong, fugitive, acid for stabilizing a metal drier, the substantially-extended pot life of coating compositions using such stabilized metal drier and the curing of such coating composition to a hard tack free (i.e. not sticky to touch) film under routine curing conditions.

Coating compositions "A" and "B" were prepared from components in the amounts indicated in Table 1.

Pot life, the time for the composition to thicken to a viscosity unsuitable for coating applications, was qualitatively determined by examining the composition stored in a capped half-full clear glass jar under a head of nitrogen at room temperature.

Composition A having no trifluoroacetic acid had a pot life of less than 24 hours; composition B having trifluoroacetic acid in about a 12:1 molar excess compared to cobalt had a pot life of greater than 30 days. Moreover a film (about 10 microns thick) of composition B was tack free after curing at about 82° C. for 30 minutes, indicating the fugitive nature of the stabilizing acid.

TABLE 1

| COATING COMPOSITIONS (parts by weight) | | |
|---|---|---|
| Component: | A | B |
| UVI (75) | 5.3 | 5.3 |
| AOC | 1 | 1 |
| Co (.1) | 0.5 | 0.5 |
| TFA (10) | — | 0.12 |
| ETOH (80) | 1.14 | 1.14 |
| Pot life (days) | <1 | >30 |

EXAMPLE 2

This example serves to illustrate the use of trifluoroacetic acid as a strong, fugitive acid for stabilizing metal drier in coating compositions containing free radical initiator, and the curing of such coating compositions.

Coating compositions "C", "D" and "E" having benzoyl peroxide free radical initiator were prepared from components in the amounts indicated in Table 2. The greatly extended pot life of composition E (i.e. greater than 48 hours) is attributed to the presence of trifluoroacetic acid.

Films (about 10 microns thick) were cured for each composition. Compositions C and D were tack free after about 30 minutes at 82° C.; composition E was tack free after about 20 minutes at 99° C.

TABLE 2

| COATING COMPOSITION (parts by weight) | | | |
|---|---|---|---|
| Component | C | D | E |
| UVI (75) | 5.3 | 5.3 | 5.3 |
| AOC | 1 | 1 | 1 |
| Co (.1) | | | 0.5 |
| Co (1) | 0.1 | 0.2 | |
| BPO | 1.5 | 1.5 | 1.5 |
| TFA | | | 0.12 |

TABLE 2-continued

| COATING COMPOSITION (parts by weight) | | | |
|---|---|---|---|
| Component | C | D | E |
| MEK | 0.86 | 0.76 | |
| MAK | | | 0.25 |
| BYK | | | 0.06 |
| Pot life (hours) | <2 | <2 | >48 |

EXAMPLE 3

Thus example serves to illustrate a relationship between the boiling point of the fugitive acid (i.e. the boiling point of trifluoroacetic acid is about 72° C.) the curing temperature for films of coating compositions according to this invention.

An acid-stabilized coating composition, prepared with components in the amounts indicated in Table 3, was cast in several films (about 10 microns thick) which were cured at various temperatures, i.e. about room temperature ($\sim$20° C.), 60° C. and 100° C.

The films became tack free more rapidly as the curing temperature increased. For example, films cured at about room temperature became tack free between 8 and 24 hours; films cured at about 60° C. became tack free between 30 minutes and 1 hour; and films cured at about 100° C. became tack e within 20 minutes.

TABLE 3

| COATING COMPOSITIONS (parts by weight) | |
|---|---|
| Component: | F |
| UVI (75) | 5.3 |
| AOC | 1 |
| Co (.1) | 0.5 |
| TFA (10) | 0.12 |
| ETOH (80) | 0.4 |
| MEK | 0.74 |

EXAMPLE 4

This example serves to illustrate the use of acetic acid as a fugitive acid for stabilizing a metal drier.

Coating compositions "G" and "H" were prepared from components in the amounts indicated in Table 4. A film of composition G was tack free after curing for about 30 minutes at 82° C. Composition H had a pot life of between 6 and 32 hours.

TABLE 4

| COATING COMPOSITIONS (parts by weight) | | |
|---|---|---|
| Component: | G | H |
| UVI (75) | 5.3 | 5.3 |
| AOC | 1 | 1 |
| Co (.1) | 0.5 | 0.5 |
| GAA (1) | 1.26 | 1.26 |
| ETOH (80) | — | 0.8 |
| Pot life (hours) | — | >6 |

EXAMPLE 5

This example serves to illustrate the use of glycolic acid as a strong, fugitive acid for stabilizing a metal drier, the extended pot life of coating compositions using such stabilized drier and the curing of such coating composition to a hard tack-free film.

Coating compositions "I", "J", "K", "L" and "M" were prepared from components in the amounts indicated in Table 5. Composition I was stabilized to a greater than 10-day pot life with oxalic acid; however films of composition I would not cure even at temperatures of up to about 120° C. Composition J was not effectively stabilized by trichloroacetic acid; composition J cured to a tack free film at about 82° C. for 30 minutes. Compositions K and L were not effectively stabilized by monochloroacetic acid and cyanoacetic acid, respectively; both compositions did afford tack free films when cured at about 82° C. for 30 minutes. Composition M was effectively stabilized for greater than 10 days by glycolic acid; composition M cured to a tack free film at 120° C. for 30 minutes.

TABLE 5

| | COATING COMPOSITIONS (parts by weight) | | | | |
|---|---|---|---|---|---|
| Component: | I | J | K | L | M |
| UVI (75) | 5.3 | 5.3 | 5.3 | 5.3 | 5.3 |
| AOC | 1 | 1 | 1 | 1 | 1 |
| Co (.1) | 0.5 | 0.5 | 0.5 | 0.5 | 0.5 |
| ETOH (80) | 0.4 | 0.4 | 0.4 | 0.4 | 0.4 |
| MEK | 0.4 | — | 0.54 | 0.75 | 0.85 |
| OXA (1) | 1.4 | — | — | — | — |
| TCA (1) | — | 1.8 | — | — | — |
| MCA (1) | — | — | 1.05 | — | — |
| CNA (1) | — | — | — | 0.94 | — |
| GLY (1) | — | — | — | — | 1.26 |
| Pot life (days) | >10 | <3 | >10 | <¼ | <¼ |

EXAMPLE 6

This example serves to illustrate the use of a fugitive inorganic acid as a stabilizer for a metal drier.

Coating composition "N", prepared from components in the amounts indicated in Table 6, with hydrochloric acid as a stabilizer exhibited pot life in excess of 40 hours and provided tack free films when cured at about 82° C. for 30 minutes.

TABLE 6

| COATING COMPOSITIONS (parts by weight) | |
|---|---|
| Component: | N |
| UVI (75) | 5.3 |
| AOC | 1 |
| HCl (1.8) | .25 |
| Co (.1) | .4 |
| ETOH (80) | .5 |

EXAMPLE 7

This example serves to illustrate the utility of trifluoroacetic acid in stabilizing metal drier comprising molybdenum and manganese compounds.

Compositions O, P, Q, R, S and T were prepared from components indicated in Table 7, trifluoroacetic acid significantly increases the pot life of compositions comprising molybdenum and manganese compound metal driers.

TABLE 7

| | COATING COMPOSITIONS (parts by weight) | | | | | |
|---|---|---|---|---|---|---|
| Component: | O | P | Q | R | S | T |
| UVI (75) | 5.3 | 5.3 | 5.3 | 5.3 | 5.3 | 5.3 |
| AOC | 1 | 1 | 1 | 1 | | |
| TFA (10) | — | 0.12 | 0.12 | — | 0.12 | 0.12 |
| BPO (10) | 1.5 | 1.5 | 1.5 | 1.5 | 1.5 | 1.5 |
| ETOH (80) | — | — | 0.4 | — | — | 0.4 |
| Mo (1) | 0.25 | 0.25 | 0.25 | — | — | — |
| Mn (.1) | — | — | — | 0.5 | 0.5 | 0.5 |

TABLE 7-continued

| | COATING COMPOSITIONS (parts by weight) | | | | | |
|---|---|---|---|---|---|---|
| Component: | O | P | Q | R | S | T |
| Pot life (hours) | <24 | 24–30 | 30–38 | <24 | >40 | >40 |

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:

1. A coating composition comprising
   (a) a free-radical polymerizable compound,
   (b) a metal drier reversibly inhibited to catalyzing free radical polymerization by a strong fugitive acid, and
   (c) an allyloxy compound.

2. A composition according to claim 1 comprising from about 0.001 to 1 percent by weight of said cobalt compound.

3. A composition according to claim 2 comprising from about 0.01 to 10 percent by weight of trifluoroacetic acid.

4. A composition according to claim 3 comprising from about 20 to about 80 percent by weight of said free-radical polymerizable compound selected from the group consisting of a drying oil, a vinyl monomer, an acrylic monomer, comprising an acrylyl monomer, an oligomer of any such monomer and mixtures thereof.

5. A composition according to claim 2 wherein said free-radical polymerizable compound is of the formula

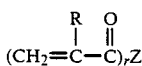

where r is selected from the group consisting of H, CH$_3$ and C$_2$H$_5$, where is an integer in the range of 2 to 10 and Z is saturated or ethylenically unsaturated residue of a polyol, a polycarboxylic acid, a polyamine, a polyepoxide or a polyisocyanate of a number average molecular weight less than about 2000 containing a hydrocarbon, polyester, polyamide, polyether or polyurethane backbone.

6. A composition according to claim 5 having a weight ratio of allyloxy compound to free-radical polymerizable compound in the range of 70:30 to 1:99, wherein said allyloxy compound is of the formula

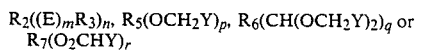

where R$_2$ is a radical of molecular weight less than about 10000 obtained by removal of active hydrogen from an active hydrogen compound selected from the group consisting of water, alcohols, thiols, carboxylic acids, carboxylic amides and amines, where the functionality of R$_2$ is n and is in the range of 1 to 10, where E is a divalent radical selected from the group represented by the formulae

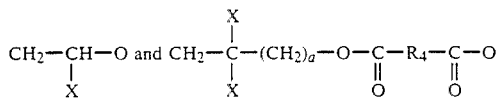

where X is selected from the group consisting of H, $CH_3$, $C_2H_5$ and $CH_2OCH_2Y$, Y being selected from the group consisting of

where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 4 and not more than about 60: where $R_5$ is a $C_2$ to $C_{12}$ aliphatic hydrocarbyl or oxahydrocarbyl radical of equivalence p in the range of 2 to 12; where $R_6$ is absent or is a $C_1$ to $C_{20}$ unsubstituted or substiuted hydrocarbyl group and q is in the range of 2 to about 30; $R_7$ is a radical of molecular weight less than about 10,000 obtained by removal of at least two active hydrogens from a polyol and r is in the range of about 1 to about 170; and wherein the allyloxy compound contains from 4 to 60 allyloxy groups per molecule.

7. A composition according to claim 6 wherein said ratio is in the range of about 60:40 to 95:5.

8. A composition according to claim 3 further comprising a free radical initiator.

9. A composition according to claim 8 wherein said free radical initiator comprises t-butyl hydroperoxide, cumene hydroperoxide, methyl ethyl ketone peroxide, lauroyl peroxide, benzoyl peroxide, azo-bis-(isobutyronitrile), or a mixture thereof.

10. A composition according to claim 1 wherein said metal drier is a cobalt or manganese compound.

11. A composition according to claim 10 wherein said acid comprises trifluoroacetic acid.

* * * * *

UNITED STATES PATENT AND TRADEMARK OFFICE
CERTIFICATE OF CORRECTION

PATENT NO. : 4,778,864
DATED : Oct. 18, 1988
INVENTOR(S) : Christopher J. Hardiman It is certified that error appears in the above-identified patent and that said Letters Patent is hereby corrected as shown below:

On the Title Page, Item [73], "St. Louis, Mich." should read --St. Louis, Missouri--

Column 1, line 9, "coating" should read --coatings--

Column 2, line 3, "fugiitive" should read --"fugitive"--

Column 4, line 49, "acidds," should read --acids,--
Column 4, line 65, "ae" should read --are--

Column 6, line 57, "(0.1)" should read --(.1)--

Column 9, line 64, under component S in Table 7, AOC 1, insert --1--.

Column 10, line 45, where " " is an integer should read where --r-- is an integer Column 11, line 20, "substiuted" should read --substituted--

Signed and Sealed this

Sixteenth Day of May, 1989

Attest:

DONALD J. QUIGG

Attesting Officer

Commissioner of Patents and Trademarks